March 6, 1956  A. J. CURTIS  2,736,982
ARTIFICIAL FISH BAIT
Filed Aug. 16, 1954
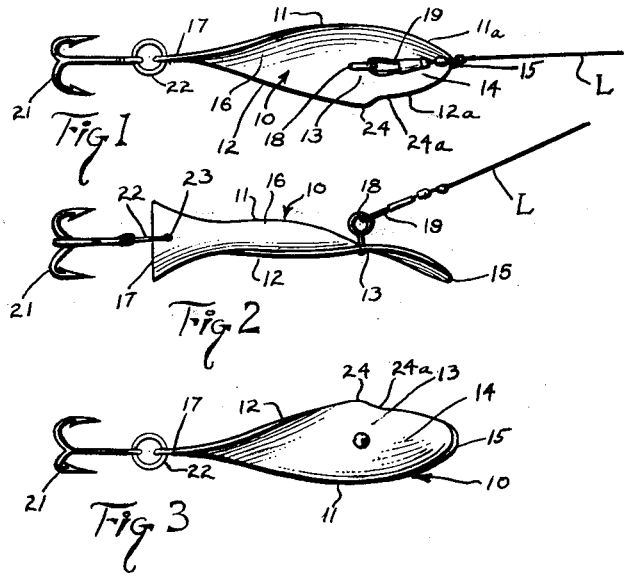
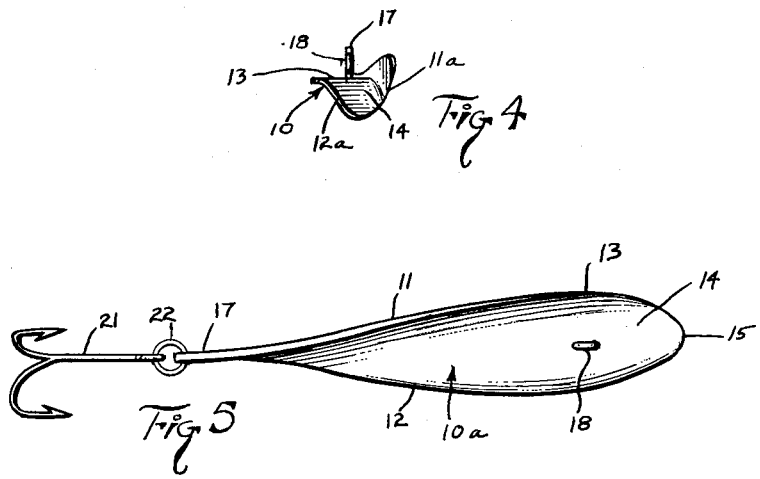
INVENTOR.
ANTHONY J. CURTIS
BY William Cleland
Attorney

2,736,982
ARTIFICIAL FISH BAIT

Anthony J. Curtis, Akron, Ohio

Application August 16, 1954, Serial No. 450,076

3 Claims. (Cl. 43—42.51)

This invention relates to an artificial fish bait.

An object of the present invention is to provide a non-spinning fish bait, which when held in water at the end of a line may be made to have unpredictable lifelike, combined wobbling and lateral and/or vertical zigzag darting action, accomplished either by a slight tugging on the line or by action of normal water current on the bait, the resultant bait action being substantially identical to that of a live minnow.

Other objects of the invention will be manifest from the following brief description and the accompanying drawing.

Of the accompanying drawing:

Figure 1 is a top plan view of an artificial bait embodying the features of the invention.

Figure 2 is a front edge or side view thereof.

Figure 3 is a bottom plan view of Figure 2.

Figure 4 is an end view, taken from the right of Figure 2, and showing the front end of the bait.

Figure 5 is a top plan view, corresponding to Figure 1, of a larger sized bait of modified form.

Referring first to Figures 1 to 4 of the drawings, there is illustrated one form of the improved fish bait, including an elongated generally ovate body 10 of relatively thin sheet material, such as aluminum or steel, the curved laterally opposite side edges 11 and 12 of the body converging in longitudinally opposite directions from a laterally substantially straight section 13 thereof intermediate front and rear ends of the body. The portion 14 of the body forwardly of said intermediate section 12 terminates in a rounded nose 15 and may be twisted downwardly in one lateral direction out of a general plane of the body passing through said intermediate section, to present a substantial proportion of the upper surface of said forward body portion 14 at a downward inclination both forwardly and in said one lateral direction. The portion 16 of the body rearwardly of said intermediate section may be twisted in laterally opposite direction with respect to said front portion 14, the twist being further continued to form a terminal portion 17 in a plane at an acute angle substantially normal to said general plane of the body, and having a fan shape simulating the tail of a fish, said general plane approximately passing through a vertical center of tail portion 17 (as viewed in Figure 2) as well as through said intermediate section 13.

Attached to the bait body, centrally of said intermediate section 13, to swivel about an axis normal thereto, may be an eyelet 18, to which a line L is attachable by means of a releasable fastener 19 of known type. It has been found that the bait action, to be further described later, is highly satisfactory when the line attaching eyelet 18 and the intermediate section 13 to which it is attached are located at a distance from the front end or nose 15 of the bait approximating somewhere between one-fifth to one-half of the length of the body, this distance being slightly less than one-third of said body length, as shown.

A gang hook 21 is attached to the rear of the bait body 10, as by a ring 22 received through a hole 23 in the tail portion, centrally thereof or substantially in said general plane of the body.

It has been found that the bait action is greatly improved for still fishing in particular, as distinguished from trolling, by making the portion of body 10 adjacent said intermediate unsymmetrical in lateral width. Accordingly, the body is extended to provide a relatively small longitudinally rounded lateral extension 24, located laterally opposite the intermediate section 13, and on the side of the body opposite the downturned edge portion 11a, thereby defining an inwardly offset portion 24a at the forward end of the body. This construction affects the action of the bait, with particular reference to the depth to which the bait will dart, as will be described later.

In use of the bait described in connection with Figures 1 to 4, in still water, the fisherman casts or throws the same into the water and then holds the line L generally relaxed or with only slight pressure, to maintain the bait at desired depth below the surface of the water. Slight forward tugging on the line L will then cause the bait to dart unpredictably in various directions, including lateral wiggling and partial rolling or wobbling action combined with forward darting action in either of laterally opposite directions and/or either of vertically opposite directions. Such action, in conjunction with light reflections from the bait body 10 simulate very closely the antics of a minnow or other small fish, which is very attractive to relatively larger fish. When the bait is similarly used in moving water the natural currents, with properly relaxed control of the line L, will cause similar unpredictable forward darting movement of the bait, that is, without necessarily tugging on the line. The protrusion 24 of the body 10 appears to provide an off-balance condition, in conjunction with the inclined front portion 14 and the location of line-attaching eyelet 18, which controls the extent of the action described.

Figure 5 illustrates a bait which is particularly adaptable for trolling, the same being of larger proportions than the bait of Figures 1 to 4 and having a body 10a shaped substantially the same, except that the edge extension 24 previously described has been omitted. The action of this bait in water is also somewhat the same as described above, except that upon being trolled or otherwise steadily retrieved in water it will assume an inverted position, similar to that shown in Figure 2, and it will not have as much vertical movement in connection with its lateral darting action. By locating the line-attaching eyelet 18 nearer the nose 15 of the body 10a, the vertical movement of the bait will be reduced accordingly. Like parts have been given the same numerals as previously, except as otherwise noted.

Other modifications of the invention may be resorted to without departing from the spirit thereof or the scope of the appended claims.

What is claimed is:

1. An artifical bait comprising a body of greater length than width, shallow in thickness, and unsymmetrical in the central portion thereof, the forward and rear ends of the body being substantially symmetrical and of triangular formation, said central portion of the body being provided with a twist and the forward and rear portions thereof being in planes in angular relation to each other, other than 180°, the central portion of the body where it meets the forward portion having an edge defining with the corresponding edge of the forward portion a reverse curve, said body having in the intermediate portion and slightly to the rear of the forward portion and on the upper surface thereof means to which a line may be attached and said rear portion having means for attachment of a hook.

2. An artificial bait comprising a body of greater length than width, and shallow in thickness, said body having a central portion and substantially symmetrical forward and rear ends, the forward end of the body being of generally triangular formation and the rear end thereof being in the form of a fan-shaped tail, said central portion of the body being provided with a twist and the forward and rear portions thereof being in planes in angular relation to each other, other than 180°, said forward portion being forwardly downturned with respect to said central portion, said central portion where it meets said forward portion having edges which merge smoothly with the edges of the forward portion, said body having adjacent the juncture of said central and forward portions and on the upper surface of the body means to which a line may be attached and said rear portion having means for attachment of a hook.

3. An artificial bait comprising a body of greater length than width, shallow in thickness, and unsymmetrical in the central portion thereof, the forward and rear ends of the body being substantially symmetrical and of triangular formation, said central portion of the body being provided with a twist and the forward and rear portions thereof being in planes in angular relation to each other, other than 180°, said central portion having one edge which merges smoothly with the corresponding edge of the forward portion and a second edge which defines a reverse curve with the corresponding edge of the forward portion, said body having in the intermediate portion to the rear of said forward portion means to which a line may be attached, and said rear portion having means for attachment of a hook.

References Cited in the file of this patent

UNITED STATES PATENTS

| | | |
|---|---|---|
| 1,115,743 | Selig | Nov. 3, 1914 |
| 1,862,917 | Anderson | June 14, 1932 |
| 2,256,346 | Mathie | Sept. 16, 1941 |

FOREIGN PATENTS

| | | |
|---|---|---|
| 191,176 | Switzerland | Aug. 16, 1937 |